(12) United States Patent
Combs et al.

(10) Patent No.: US 10,531,650 B2
(45) Date of Patent: Jan. 14, 2020

(54) REEL FOR A FLY ROD WITH DRAG ASSEMBLY

(71) Applicant: The Orvis Company, Sunderland, VT (US)

(72) Inventors: Richard Shawn Combs, Winhall, VT (US); Norman Arthur Schneeberger, West Chesterfield, NH (US)

(73) Assignee: The Orvis Company, Sunderland, VT (US)

( * ) Notice: Subject to any disclaimer, the term of this patent is extended or adjusted under 35 U.S.C. 154(b) by 200 days.

(21) Appl. No.: 15/645,174

(22) Filed: Jul. 10, 2017

(65) Prior Publication Data

US 2018/0014518 A1 Jan. 18, 2018

Related U.S. Application Data

(60) Provisional application No. 62/361,473, filed on Jul. 12, 2016.

(51) Int. Cl.
*A01K 89/01* (2006.01)
*A01K 89/033* (2006.01)
*A01K 89/015* (2006.01)
*A01K 89/016* (2006.01)

(52) U.S. Cl.
CPC .......... *A01K 89/058* (2015.05); *A01K 89/016* (2013.01); *A01K 89/0193* (2015.05)

(58) Field of Classification Search
CPC .... A01K 89/016; A01K 89/05; A01K 89/055; A01K 89/058; A01K 89/03
See application file for complete search history.

(56) References Cited

U.S. PATENT DOCUMENTS

| 2,498,626 | A | * | 2/1950 | Bivans | A01K 89/01909 242/270 |
| 2,569,006 | A | * | 9/1951 | King | F16D 15/00 242/265 |
| 3,720,386 | A | * | 3/1973 | Morner | A01K 89/016 242/266 |
| 4,702,432 | A | * | 10/1987 | Kaneko | A01K 89/027 242/246 |
| 5,018,682 | A | * | 5/1991 | Aoki | A01K 89/033 242/268 |
| 5,529,150 | A | | 6/1996 | Buckley et al. | |

(Continued)

FOREIGN PATENT DOCUMENTS

KR 20060125205 A * 12/2006 .......... A01K 89/016

*Primary Examiner* — Emmanuel M Marcelo
(74) *Attorney, Agent, or Firm* — BakerHostetler

(57) ABSTRACT

A reel for a fly rod is described. The reel includes a frame and a spool for holding a supply of fly line. The spool is rotatable about an axis relative to the frame. The reel includes a drag assembly coupled to the spool and the frame. The drag assembly is configured to control resistance to rotation of the spool relative to the frame. The drag assembly includes a first thrust plate that includes at least one ramp surface and a second thrust plate. At least one curved member is carried by the second thrust plate. The at least one curved member is configured to ride along the at least one ramp surface, such that rotation of the second thrust plate about the axis causes movement of the first thrust plate along the axis so as to control the resistance to rotation of the spool relative to the frame.

13 Claims, 6 Drawing Sheets

(56) References Cited

U.S. PATENT DOCUMENTS

| | | | |
|---|---|---|---|
| 6,508,426 B1 * | 1/2003 | Whittle-Herbert | ........................... A01K 89/016 242/317 |
| 6,520,297 B1 | 2/2003 | Lumpkin et al. | |
| 2003/0168541 A1 | 9/2003 | Hill et al. | |
| 2005/0011977 A1 * | 1/2005 | Datcuk, Jr. | .......... A01K 89/033 242/244 |
| 2009/0090802 A1 * | 4/2009 | Chivarov | ............. A01K 89/046 242/303 |
| 2016/0157473 A1 * | 6/2016 | Header | ................ A01K 89/006 242/300 |

* cited by examiner

REEL FOR A FLY ROD WITH DRAG ASSEMBLY

CROSS-REFERENCE TO RELATED APPLICATIONS

The present application claims priority to and the benefit of U.S. Provisional Application No. 62/361,473, filed Jul. 12, 2016, the entire disclosure of which is incorporated by reference into the present application for all purposes.

TECHNICAL FIELD

The present disclosure relates to a reel for a fly rod and in particular to a reel with an improved drag assembly.

SUMMARY

An embodiment of the present disclosure includes a reel for a fly rod. The reel includes a frame and a spool for holding a supply of fly line. The spool is rotatable about an axis relative to the frame. The reel includes a drag assembly coupled to the spool and the frame. The drag assembly is configured to control resistance to rotation of the spool relative to the frame. The drag assembly includes a first thrust plate that includes at least one ramp surface and a second thrust plate opposite to the first thrust plate. At least one curved member is carried by the second thrust plate. The at least one curved member is configured to ride along the at least one ramp surface, such that rotation of the second thrust plate about the axis causes movement of the first thrust plate along the axis so as to control the resistance to rotation of the spool relative to the frame.

Implementations may include one or more of the following features. In an embodiment, the drag assembly includes a drag knob coupled to the second thrust plate and that is rotatable about the axis. The drag assembly is configured to attain maximum drag force in less than or equal to 360 degrees of rotation of the drag knob about the axis.

In an embodiment of the reel, the at least one curved member is a spherical bearing.

In another embodiment of the reel, the at least one ramp surfaces is three ramp surfaces and the at least one curved member is three curved members.

In yet another embodiment of the reel, the at least one ramp surface is a first ramp surface, a second ramp surface disposed between the first ramp surface and the axis, and a third ramp surface disposed at least partially between the second ramp surface and the axis. In such an embodiment, the at least one curved member is a first spherical bearing disposed on the first ramp surface, a second spherical bearing disposed on the second ramp surface, and a third spherical bearing disposed on the third ramp surface.

In yet another embodiment of the reel, the at least one ramp surface extends at least 120 degrees around the axis. Alternatively, the at least one ramp surface extends about 350 degrees around the axis.

In another embodiment of the reel, the at least one ramp surface defines at least one groove, where the at least one groove has a first end, a second end, a radial length that extends from the first end to the second end along a path about the axis, and a depth that is perpendicular to the path and that varies along the radial length. The depth at the first end is greater than the depth at the second end. The depth varies linearly between the first end and the second end. Alternatively, the depth may vary non-linearly between the first end and the second end.

In another embodiment of the reel, the drag assembly includes a drag stack adjacent to the first thrust plate, the drag stack having a first drag disc, a friction disc, and a second drag disc arranged along the axis.

Another embodiment of the present disclosure is a fly fishing kit. The fly fishing kit includes a fly rod and reel according to the embodiment disclosed in the present application.

DETAILED DESCRIPTION OF ILLUSTRATIVE EMBODIMENTS

Figure 6:
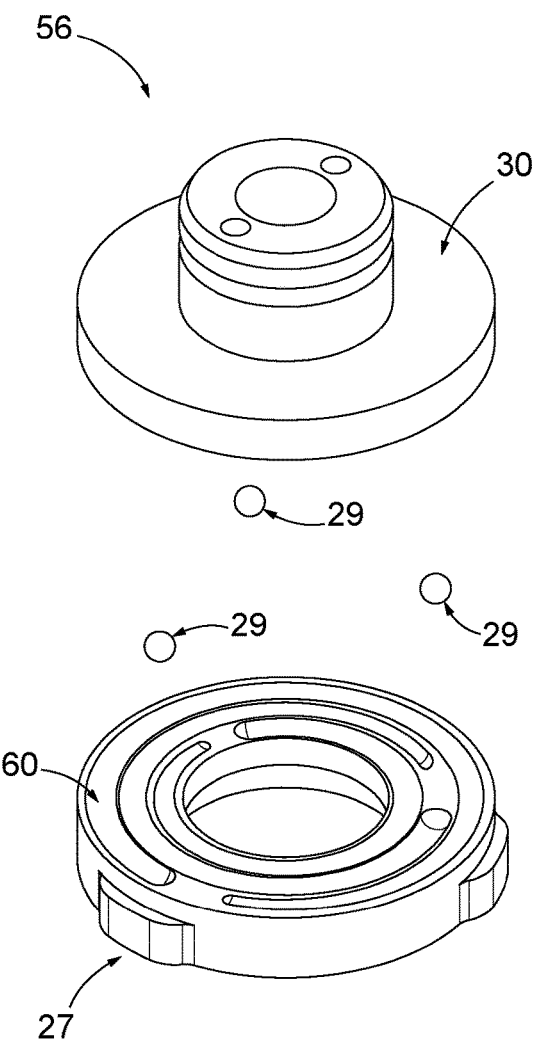
FIG. 6 is in an exploded view of the drag control mechanism shown in FIG. 5.

FIGS. 1-4 depicts a reel 2 for mounting to a fly rod (not shown) according to an embodiment of the present disclosure. The reel 2 includes a frame 10, a spool 20 rotatable about a center axis A, and a drag assembly 50 encased by the frame 10 and spool 20. The drag assembly 50 controls drag on the reel, which in this context, is the resistance to rotation of spool 20 relative to the frame 10. As the fly line is being released from the spool 20, such as when a fish is hooked, the angler can rotate a drag knob coupled to the drag assembly 50 to increase drag, or resistance to spool rotation. Increased drag requires a greater force to cause a given amount of spool rotation and thus line release (or retraction). The drag assembly 50, via rotation of the drag knob, can also decrease drag. Decreased drag requires a lower force to cause spool rotation and line release (or retraction). As shown in FIG. 6, embodiments of the present disclosure include a drag assembly 50 with at least one ramp surface 60 and at least one curved member 29 that rides along the at least one ramp surface 60 when the drab knob is rotated. As explained below, the ramp surface 60 and curved member provide better, more precise control of drag over smaller rotational amounts of the drag knob.

Figure 1:
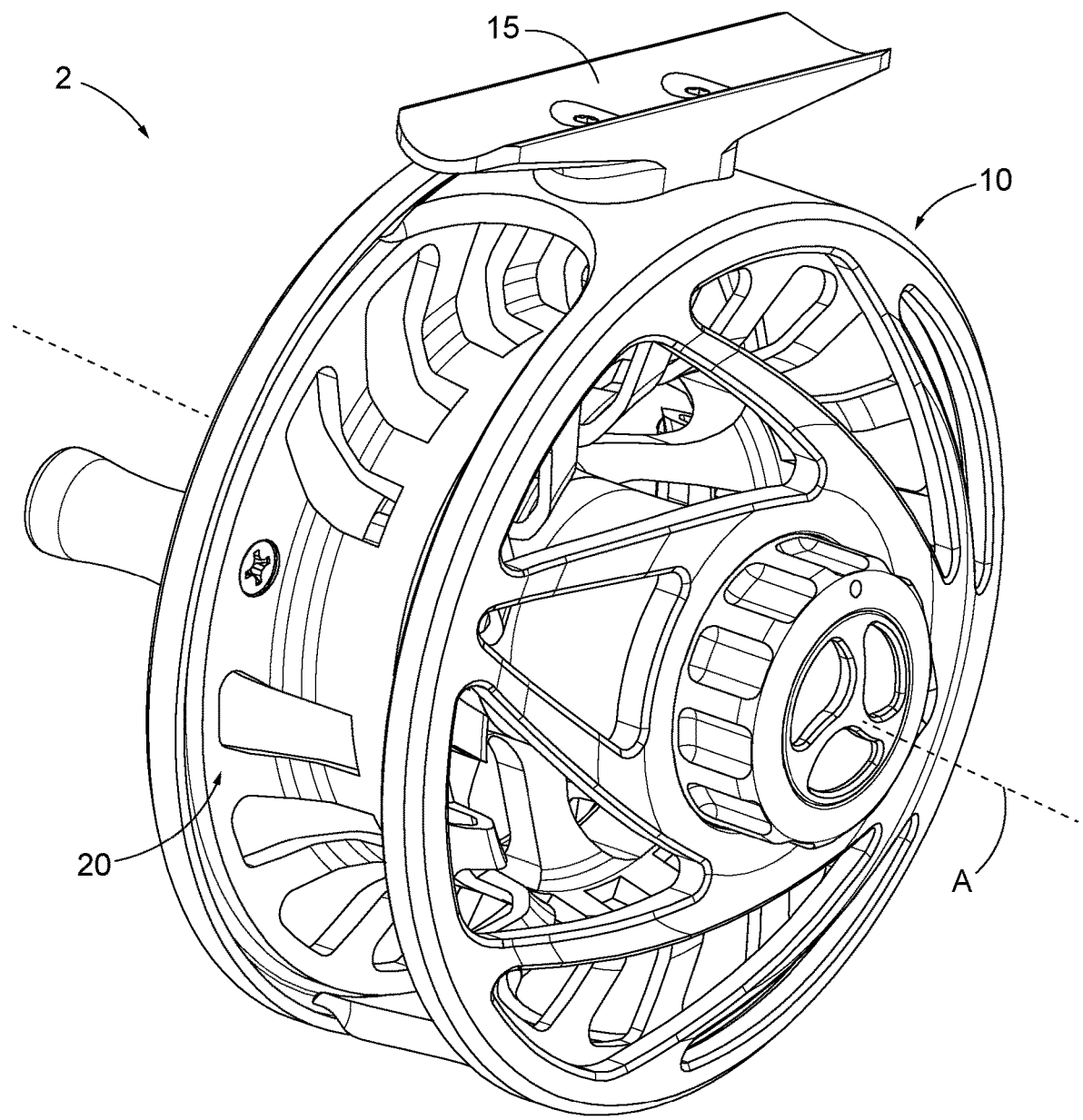
FIG. 1 is a perspective view of a reel according to an embodiment of the present disclosure.
Figure 2:
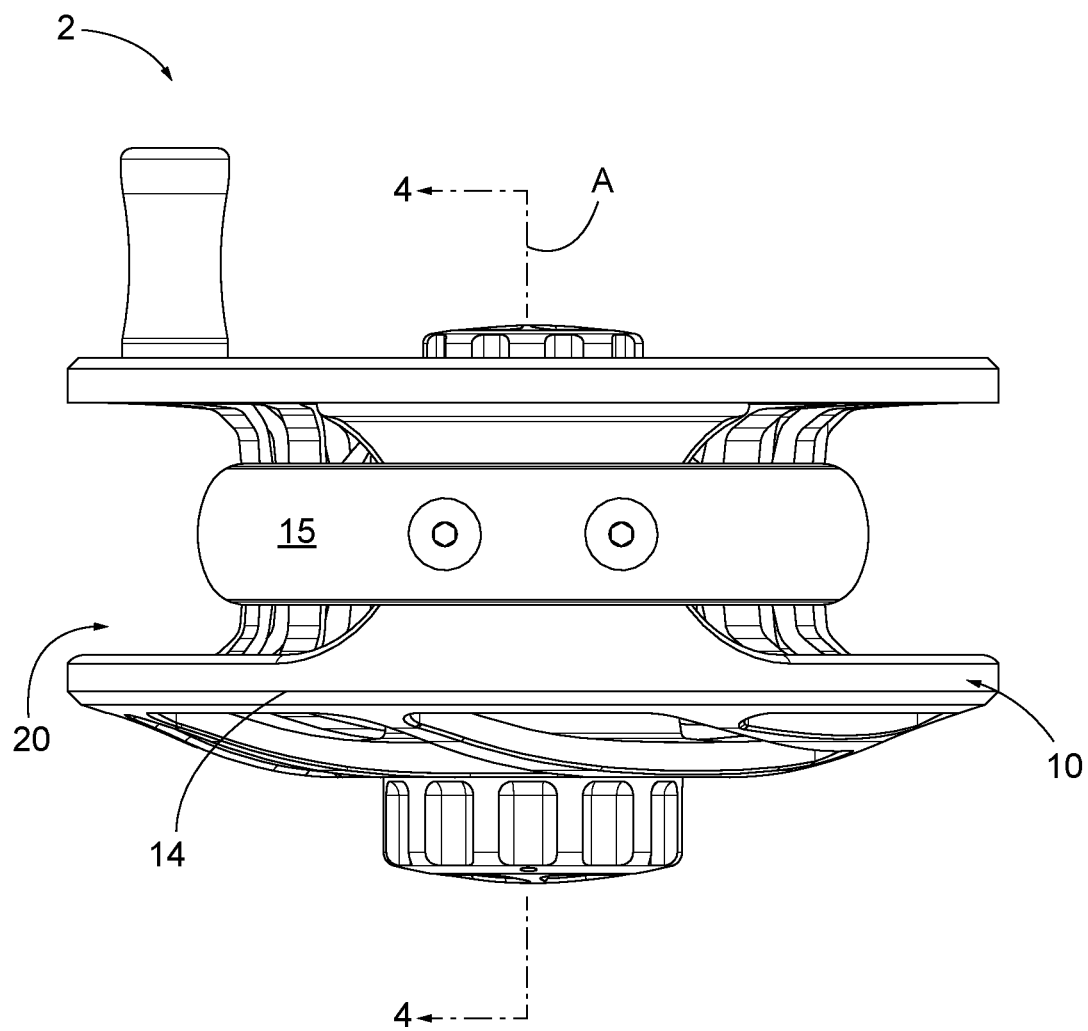
FIG. 2 in an top view of the reel shown in FIG. 1, illustrating the rod foot.
Figure 3:
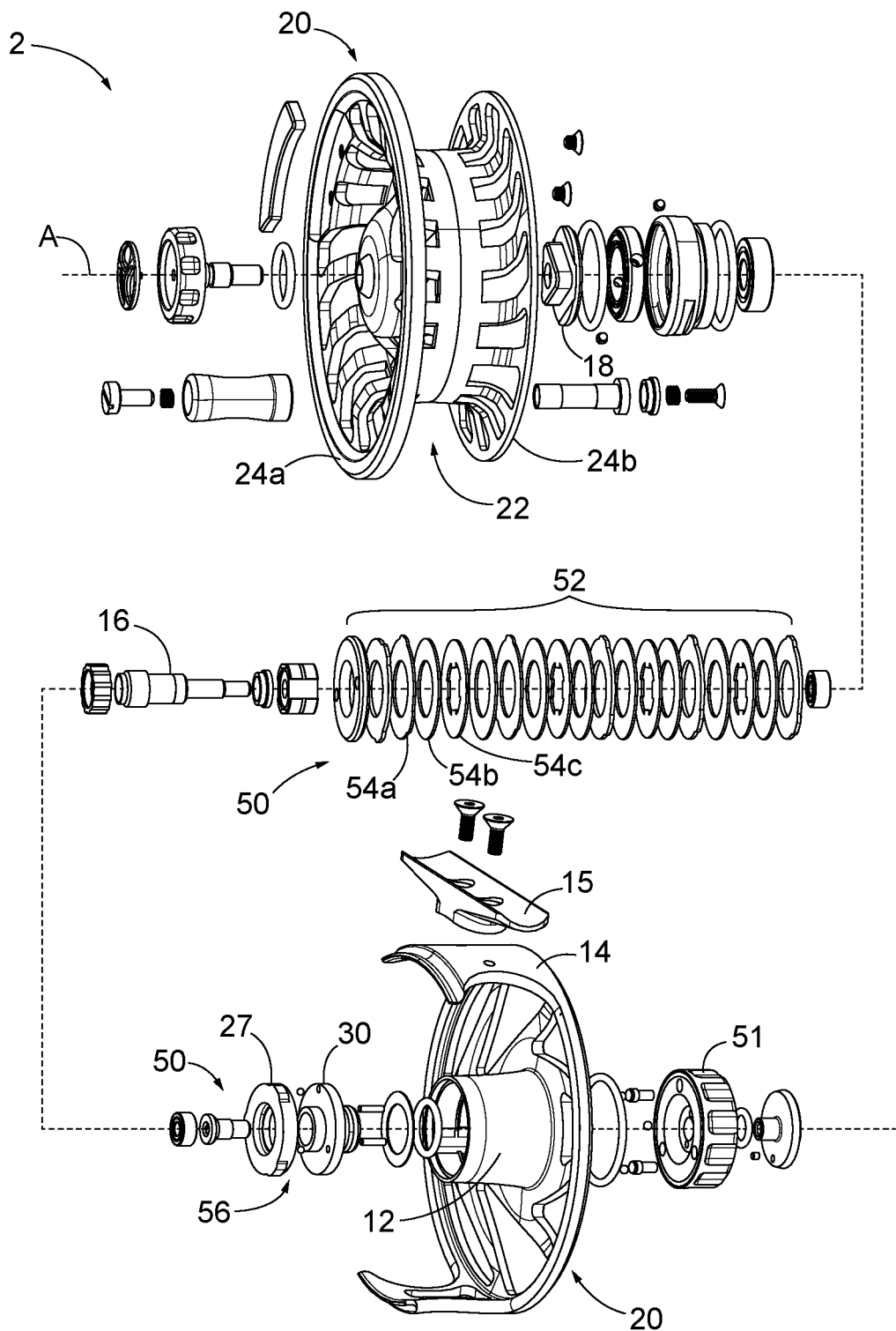
FIG. 3 in an exploded view of the reel shown in FIGS. 1 and 2.
Figure 4:
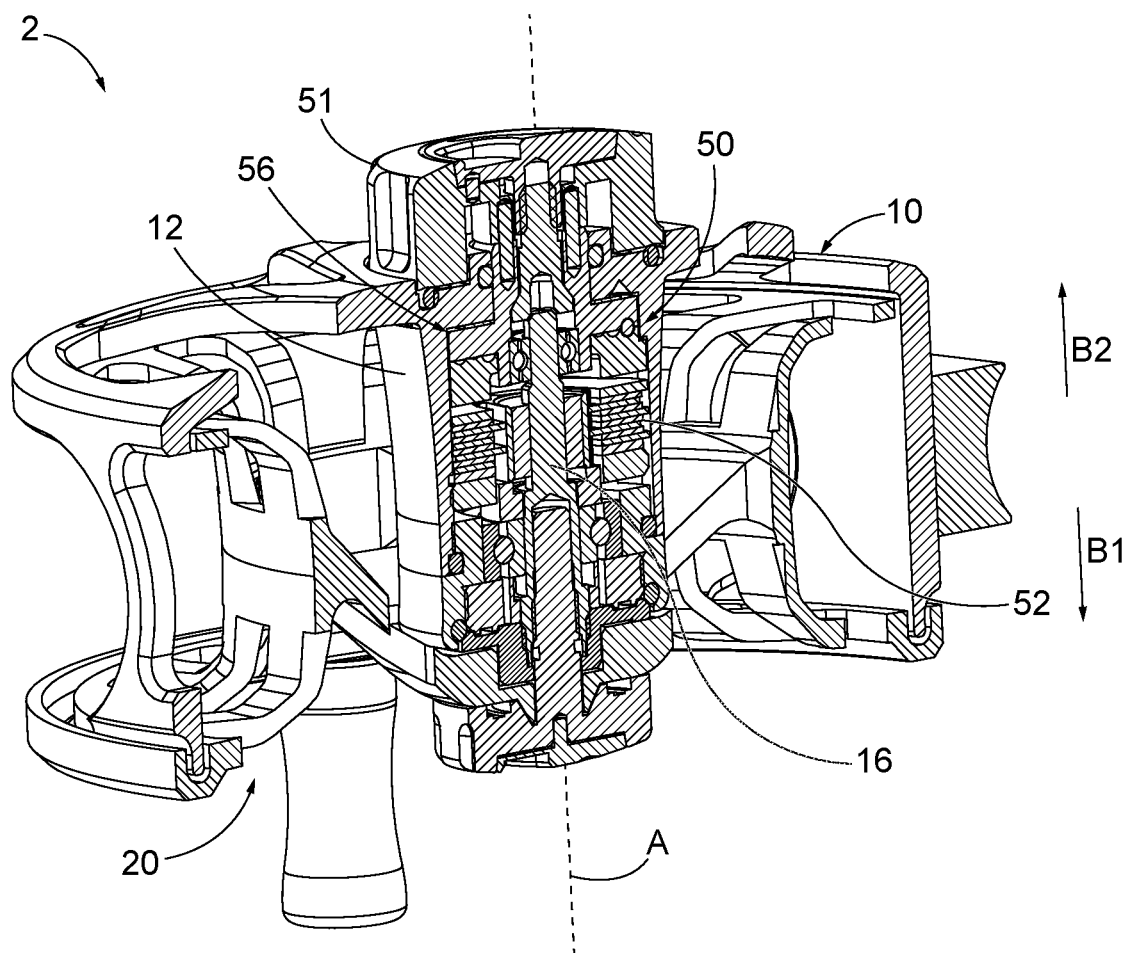
FIG. 4 is a cross-section of the reel taken along line 4-4 in FIG. 3.
Figure 5:
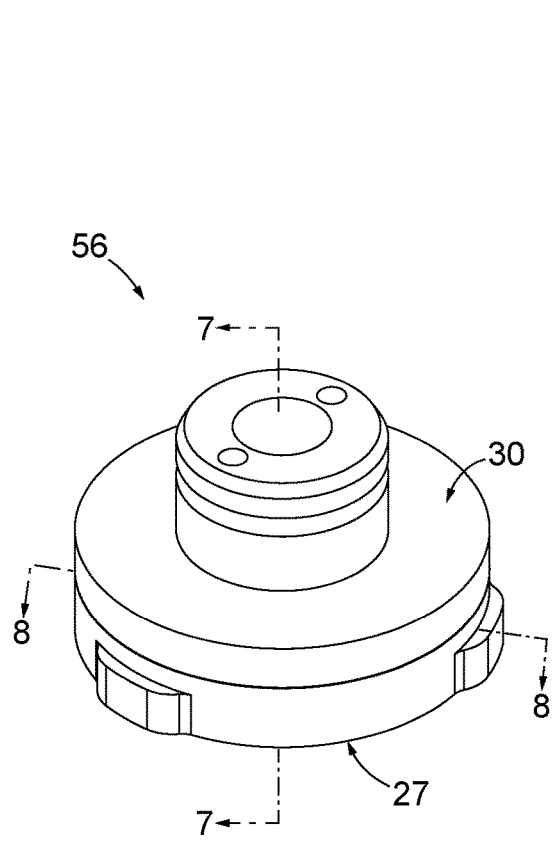
FIG. 5 is a perspective view of a drag control mechanism in the reel illustrated in FIGS. 1-4.

The reel 2 includes a frame 10 and a spool 20 rotatably coupled to the frame 10. The frame 10 supports the spool 20. As illustrated in FIGS. 3-4, the frame 10 has a hub 12 that extends along the axis A, an outer wall 14, and a foot 15 on the outer wall 14. The foot 15 is configured to attach to a fly rod (not shown) as in known in the art. The drag assembly 50 is contained at least partially within the hub 12. The spool 20 holds a supply of fly line, e.g. backing and a tippet. The spool 20 is rotatable relative to the frame 10 to release the fly line or retract the fly line, depending on the rotation direction. The spool 20 has an arbor 22, a first side wall 24a extending from the arbor 22, and a second side wall 24b extending the arbor 22 opposite the first side wall 24a. A shaft 16 couples the frame 10 to the spool 20 via shaft perch 18. The spool 20 can have different sized arbors as needed.

The drag assembly 50 is used to control resistance to rotation. As shown in FIG. 3-4, the drag assembly 50 is coupled to the shaft 16. As illustrated, the drag assembly 50 includes a drag knob 51 coupled to an end of the shaft 16, a drag stack 52 and a drag control mechanism 56 disposed generally between the drag knob 51 and the drag stack 52. The drag control mechanism 56 and the drag stack 52 are disposed along the shaft 16. The drag stack 52 has a first drag disc 54a, a friction disc 54b, and a second drag disc 54c arranged along the axis A. As illustrated, there are multiple sets of drag stacks 52 in the drag assembly 50. However, one drag stack or multiple sets could be used in other embodiments. Each drag stack 52 is retained along the shaft 16 with retainers (not numbered) on either side of the drag stack 52. The drag stack 52 may be a typical arrangement of drag discs and friction discs that are used to control drag of a fly reel. The drag assembly 50 may also include other components that are typically found in reels, such as o-rings, washers, and the like.

As shown in FIGS. 3 and 5-8, the drag assembly 50 includes a drag control mechanism 56. The drag control mechanism 56 includes a first thrust plate 27 and a second thrust plate 30 that is positioned adjacent to the first thrust plate 27. A beveled washer (not numbered) is located between the first thrust plate 27 and the drag stack 52. The drag assembly 50 also includes at least one ramp surface 60 and at least one curved member 29 carried by the first thrust plate 27 the second thrust plate 30, respectively. The curved members 29 and ramp surfaces 60 are used to better control drag forces of the reel, as will be explained below.

Referring to FIGS. 5-8, in accordance with the illustrated embodiment, the first thrust plate 27 includes at least one ramp surface 60 (e.g. a plurality of ramp surfaces 60A, 60B, and 60C) that extend around the center axis A of the reel. Reference number 60 may be used interchangeably with reference numbers 60A, 60B, 60C. Each ramp surface 60 defines a groove. Thus, the first thrust plate includes at least one, or a plurality of, grooves. The first thrust plate 27 includes a first planar surface 32, a second surface 34 opposite the first planar surface 32, and a central opening 36 through which the shaft 16 extends. The ramp surfaces 60 extend into the first thrust plate 27 from the first planar surface 32 in a direction that is aligned with the central axis A.

Figure 8:
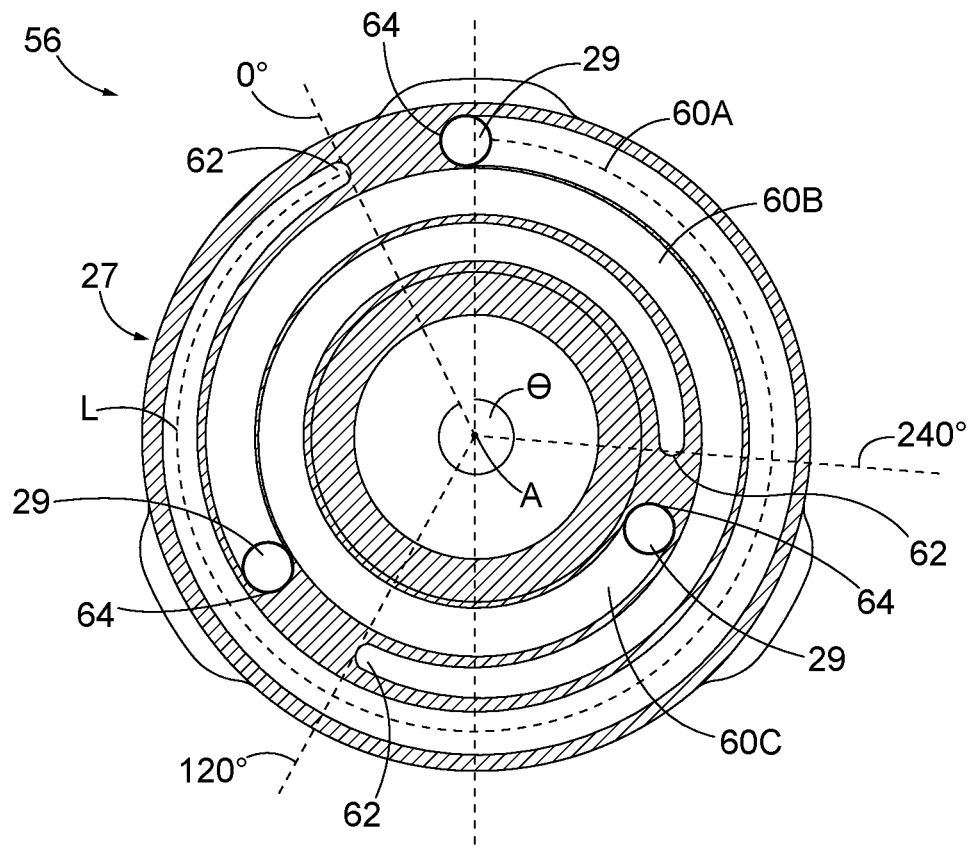
FIG. 8 is a cross-section of the drag control mechanism taken along line 8-8 in FIG. 7.

As shown in FIG. 8, the first thrust plate 27 includes a plurality of ramp surfaces 60. The plurality of ramp surfaces include a first ramp surface 60A, a second ramp surface 60B, and a third ramp surface 60C. The first ramp surface 60A is the outermost ramp surface. The second ramp surface 60B is an intermediate ramp surface positioned closer to the center axis A than the first ramp surface 60A. The third ramp surface 60C is the innermost ramp surface and is positioned closer to the central axis A than the second ramp surface 60B. The ramp surfaces 60 extend along an arc θ of about 350 degrees around the center axis A. However, the ramp surfaces 60 may extend less than 350 degrees around the center axis A or they could extend more than 350 degrees around the center axis A. The beginning end 62 of first ramp surface 60A is shown at the 0 degree position. The beginning end 62 of the second ramp surface 60B is at the 120 degree position. The beginning end of the third ramp surface 60B is shown at the 240 degree position. Each ramp surface 60 has a first end 62 (or beginning end), a second end 64 (or terminal end), a radial length L (or arc length) that extends from the first end to the second end along a ramp surface path P. The radial length L can be determined by the equation $L=(\pi r\,\theta)/180$, where r is the radius from the center axis A, and angle θ is the angle which the ramp surface subtends. The first and second ends 62 and 64 of each ramp surface 60A-60C have similar reference numbers in the figures. The first end 62 is typically the narrow and shallow end and the second end 64 is typically the wider and deeper end, as will be explained below.

Continuing with FIGS. 5-8, the second thrust plate 30 can carry the curved members 29. In the illustrated embodiment, the curved members are spherical bearings that ride or roll along the ramp surfaces. However, the curved members can take other forms designed to ride along the surfaces 60. For instance, the curved members could be frusto-conical elements or cylinders and the like. It should be appreciated, however, curved members with frusto-conical shape or cylinders would ride along a complementary shaped and configured ramp surface.

Figure 7:
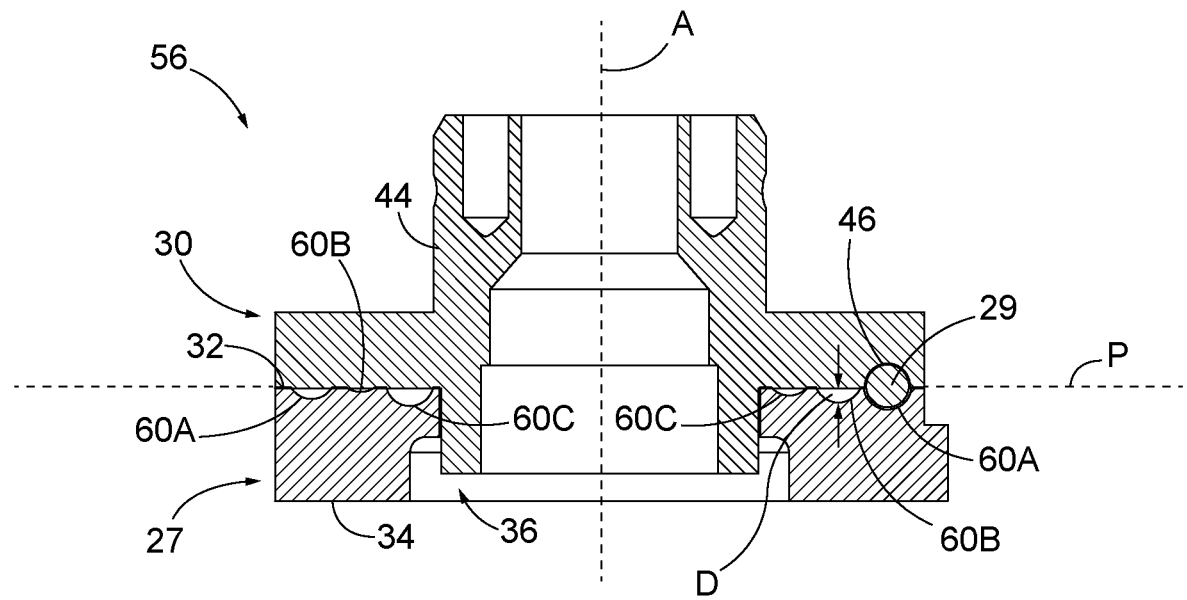
FIG. 7 is a cross-section of the drag control mechanism taken along line 7-7 in FIG. 6.

As shown in FIGS. 5-8, the second thrust plate 30 includes central body 44 that is coupled to the drag knob 51, and an opening that the shaft 16 extends through. The drag knob 51 is coupled to the second thrust plate 30 so that rotation of the drag knob 51 causes the second thrust plate 30 to rotate. The second thrust plate 30 is rotatable relative to the first thrust plate 27. The second thrust plate 30 also includes a cavity 46 in which a curved member 29 rests, as best shown in FIG. 7. The bearings 29 rest in cavities 46 on the second thrust plate 30 in such a way that the bearings 29 rotate along with rotational movement of the second thrust plate 30, but also ride along the ramp surfaces 60. The second thrust plate 30 is coupled to the drag knob 51 so that rotation of the drag knob 51 rotates the second thrust plate 30 with respect to the frame 10. The bearings 29 ride along the ramp surfaces 60 to cause displacement of the first thrust plate 27 along the central axis A, as will be explained below.

As shown in FIGS. 7 and 8, each ramp surface 60 (or groove) has a depth D that varies along their respective lengths L. The depth D is the distance from a plane P aligned with a planar surface 32 of the first thrust plate 27 to a reference point along the ramp surface 60. The depth D is parallel to the center axis A. The changing depth D defines a ramp surface along which the bearings 29 ride as the drag knob 51 is rotated. As illustrated, the depth D is smallest at the first ends of each ramp surface 60A, 60B, 60C, and is its greatest at the second ends of each ramp surface 60A, 60B, and 60C. The depth D can change linearly or non-linearly between the first end and the second end of the ramp surfaces. It should be appreciated that the profile of the ramp surface 60, or how the depth D varies along the radial length L of the ramp surface, can be modified as needed to affect the drag characteristics of the reel. Furthermore, each ramp surface can have maximum width that is perpendicular to the radial length L and depth D. As illustrated, the width is smallest at the first ends of each ramp surface 60A, 60B, 60C, and is its greatest at the second ends of each ramp surface 60A, 60B, and 60C.

As shown in FIG. 8, the first thrust plate 27 includes three separate ramp surfaces 60 and the second thrust plate 30 includes three curved members 29 that rest on the three separate ramp surfaces 60. In the illustrated embodiment, the three ramp surfaces and three curved members are used to distribute pressure more evenly across the first thrust plate 27 as the drag knob 51 is rotated. It should be appreciated that more than three ramp surfaces and three curved members could be used. However, increases in the number of ramp surfaces/curved members may require adjustments in the dimensions of the drag assembly and/or other reel components. Alternatively, it possible that fewer than three ramp surfaces and three curved members can be used as well.

In operation, rotation of the second thrust plate 30, via drag knob rotation, causes the bearings 29 to ride along respective ramp surfaces 60. Rotation of the drag knob 51 and the second thrust plate 30 in a first direction, e.g. clockwise, advances the bearings 29 toward the more shallow end of the ramp surfaces 60. This, in turn, urges the first thrust plate 27 against the bevel washer along the axis A in a first axial direction B1. This displacement compresses the drag stack 52, thereby increasing the drag. Thus, displacement of the first thrust plate 27 along the axis A increases the resistance of rotation of the spool 20 relative to the frame 10 (FIG. 4). Spool rotation may occur when tension is applied to the line, such as when a fish is hooked. Rotation of the drag knob in the second direction, e.g. counter-clockwise, advances the bearings 29 toward the more deep end of the ramp surfaces 60. This, in turn, causes the first thrust plate 27 to retract in a second axial direction B2 that is opposite to the first axial direction B1. Displacement of the first thrust plate 27 along the second axial direction B2 lessens compressive forces applied to the drag stack 52, which decreases the drag of spool 20. In one example, the maximum drag force can be achieved with less than 360 degrees of rotation of the drag knob. In another example, the maximum drag force can be achieved with less than 350 degrees of rotation of the drag knob. In other examples, the maximum drag force can be achieved with less than 340 degrees of rotation of the drag knob, such as less than 330 degrees, less than 320 degrees, or some value between 120 degrees and 350 degrees.

The reel 2 is configured to allow for quick adjustment between minimum and maximum drag forces. The maximum drag force can be selected to slow the biggest game fish an angler can hook on a fly rod. However, the startup inertia is minimal to minimize tippet breakage on an initial run. The drag assembly 50 can adjust to full drag in less than one full rotation of drag knob. This allows the drag to be easily adjusted in the heat of a battle with an attached fish, without repetitive twisting of a drag knob as in conventional drag assemblies. Another unique feature is finer control at the low end of the drag, so the angler can go quickly from line-stripping drag to fighting drag with minimal adjustment. And a hard stop at maximum drag ensures the angler knows when drag is at its maximum.

What is claimed:

1. A reel for a fly rod, comprising:
   a frame;
   a spool for holding a supply of fly line, the spool being rotatable about an axis relative to the frame; and
   a drag assembly coupled to the spool and the frame, the drag assembly being configured to control resistance to rotation of the spool relative to the frame, the drag assembly having:
   a first thrust plate that includes at least one ramp surface;
   a second thrust plate opposite to the first thrust plate; and
   at least one curved member carried by the second thrust plate, the at least one curved member being configured to ride along the at least one ramp surface, such that rotation of the second thrust plate about the axis causes movement of the first thrust plate along the axis so as to control the resistance to rotation of the spool relative to the frame.

2. The reel according to claim 1, wherein the drag assembly includes a drag knob coupled to the second thrust plate and that is rotatable about the axis,
   wherein the drag assembly is configured to attain maximum drag force in less than or equal to 360 degrees of rotation of the drag knob about the axis.

3. The reel according to claim 1, wherein the at least one curved member is a spherical bearing.

4. The reel according to claim 1, wherein the at least one ramp surface is three ramp surfaces and the at least one curved member is three curved members.

5. The reel according to claim 1, wherein the at least one ramp surface is a first ramp surface, a second ramp surface disposed between the first ramp surface and the axis, and a third ramp surface disposed at least partially between the second ramp surface and the axis,
   wherein the at least one curved member is a first spherical bearing disposed on the first ramp surface, a second spherical bearing disposed on the second ramp surface, and a third spherical bearing disposed on the third ramp surface.

6. The reel according to claim 1, wherein the at least one ramp surface extends at least 120 degrees around the axis.

7. The reel according to claim 1, wherein the at least one ramp surface extends about 350 degrees around the axis.

8. The reel according to claim 1, wherein the at least one ramp surface defines at least one groove, wherein the at least one groove having a first end, a second end, a radial length that extends from the first end to the second end along a path about the axis, and a depth that is perpendicular to the path and that varies along the radial length.

9. The reel according to claim 8, wherein the depth at the first end is greater than the depth at the second end.

10. The reel according to claim 8, wherein the depth varies linearly between the first end and the second end.

11. The reel according to claim 8, wherein the depth varies non-linearly between the first end and the second end.

12. The reel according to claim 1, wherein the drag assembly includes a drag stack adjacent to the first thrust plate, the drag stack having a first drag disc, a friction disc, and a second drag disc arranged along the axis.

13. A fly fishing kit, comprising:
    a. a fly rod; and
    b. the reel according to claim 1.

* * * * *